United States Patent [19]
Langlois

[11] 3,895,881
[45] July 22, 1975

[54] TOOL-CARRIERS WITH RETRACTABLE TOOL-BITS

[75] Inventor: Christian Charles Langlois, Billancourt, France

[73] Assignees: Regie Nationale des Usines Renault, Billancourt; Automobiles Peugeot, Paris, both of France

[22] Filed: Mar. 29, 1973

[21] Appl. No.: 346,038

[30] Foreign Application Priority Data
  Apr. 10, 1972 France .............................. 72.12465

[52] U.S. Cl. ................ 408/156; 82/24 A; 90/11 A; 90/11 D; 408/158; 408/239; 408/714
[51] Int. Cl. ............................................ B23b 47/00
[58] Field of Search ........... 408/154, 156, 714, 158, 408/153, 239 A, 159, 180; 82/24 A; 90/11 A, 11 D

[56] References Cited
UNITED STATES PATENTS

| | | | |
|---|---|---|---|
| 2,983,166 | 5/1961 | Davidson | 408/156 |
| 3,190,152 | 6/1965 | Werth | 408/714 X |
| 3,261,236 | 7/1966 | Flannery | 408/714 X |
| 3,379,077 | 4/1968 | Gustafson | 408/156 |

*Primary Examiner*—J. M. Meister
*Assistant Examiner*—Z. R. Bilinsky
*Attorney, Agent, or Firm*—Stevens, Davis, Miller & Mosher

[57] ABSTRACT

A tool-carrier with retraction of the tool-bit, comprising a bit-holder member displaceably mounted with respect to a tool-carrier body in order to cause the tool-bit to pass from a working position to a retracted position and vice-versa, in which the tool-bit holder member and the tool-carrier body comprise conical surfaces for their respective centering in the axis on which they are displaceable, a rod rigidly fixed to the bit-holder member and subjected to a restoring device in the body tending normally to return the conical surfaces to the centering position, the rod being further subjected in the centering position to a bending stress which tends to cause the bit-holder member to move radially closer to the axis of the tool-carrier body when they are displaced from their centering position by the action of an external force.

8 Claims, 2 Drawing Figures

TOOL-CARRIERS WITH RETRACTABLE TOOL-BITS

The present invention relates to tool carriers having retractable tool-bits, these being mainly employed in boring operations in which it is desired to avoid making tool marks on the bore during the reverse travel of the tool, this being increasingly demanded from manufacturers of machines and equipment.

The known devices of this kind may be divided into the following categories:
- the devices in which the tools are mounted on small carriages which, inside the spindles, are operated by wedges, by sloping faces or by rectangular toothed racks with inclined teeth;
- devices with eccentricity and with a helicoidal ramp;
- devices in which the tool is mounted on a shaft which is not parallel to the spindle;
- one-piece tool-carriers in which the movement of the extremity of the tool-bit is effected by elastic deformation obtained by a thrust screw, hydraulic or pneumatic jack or any other means of deformation by co-operation of form.

The problem in this case is to obtain a tool-carrier which is simple, of small diametral size and capable of accurate positioning and re-placing in position of the tool-bit during operation.

The present invention has for its object a construction of a tool-carrier having a retractable tool-bit which particularly satisfies these conditions.

The tool-carrier according to the invention, comprising a tool-bit holder movably mounted with respect to the tool carrier body in order to cause the tool-bit to pass from a working position to a retracted position and vice-versa, is characterized in that the tool-bit carrier and the tool-carrier body comprise conical surfaces of respective centering in the axis in which they are movable, in that it comprises a rod fixed to the tool-bit holder and subjected to restoring means inside the body which normally urges the conical surfaces into the centering position, and in that this rod is furthermore subjected in this centering position to a bending stress tending to bring the bit-holder element radially closer to the axis of the body of the tool-carrier when they are displaced from their centering position by the action of an external force.

Two forms of construction of a tool-carrier according to the invention are described below, by way of example, reference being made to the accompanying drawings, in which.

Figure 1:
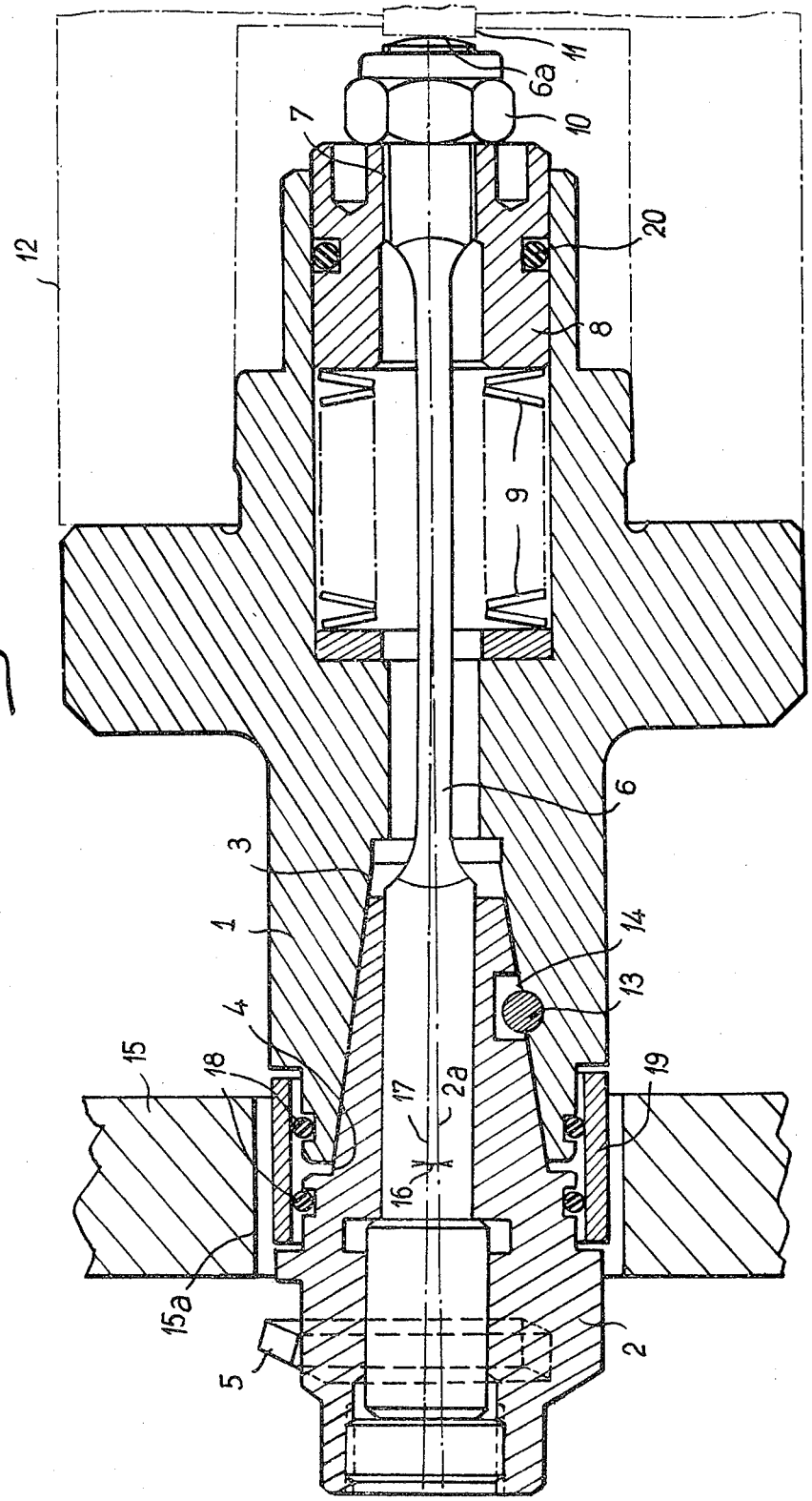
FIG. 1 is a view in axial cross-section of a tool-carrier according to the invention.

The tool-carrier shown in FIG. 1 comprises a body 1 and a bit-holder ferrule 2 having non-jamming respective centering conical surfaces indicated at 3 and 4, the tool-bit proper being shown at 5. A rod 6 locked in the ferrule and extending inside the body 1 carries in addition at its other extremity, in this case screwed on the rod at 7, a piston 8 sliding in the body 1.

This piston is subjected to reverse restoring means 9 for the rod 6, in this case constituted by a stack of Belleville washers, which thus urge the conical surfaces 3 and 4 into contact with each other. In addition, the rod 6 may be subjected to a control thrust opposite to that of the restoring means 9, intended to be applied in this case on the free rear extremity 6a of the rod, projecting through a locking nut 10 which blocks the rod-piston assembly.

This control thrust is ensured, for example as indicated in chain-dotted lines, by a push-rod shown at 11 forming part of a spindle-carrier head, on the spindle 12 of which the tool-carrier body is intended to be fixed.

A pin 13 ensures, with a certain axial play 14, the fixing together for rotation of the tool-carrier body 1 and the bit-holder ferrule 2.

The position shown of respective centering of the body 1 and the ferrule 2, for which the restoring means 9 urges the conical surfaces 3 and 4 into contact with each other, is the normal position of use of the tool-carrier for machining, in this case illustrated by the position of the tool-bit 5 after carrying out a bore 15a in a work-piece 15.

In this position, the rod 6 is subjected to a bending stress, obtained in this case by a displacement 16 of the axis 2a of the ferrule 2 and of the axis 17 of the housing of the rod in the ferrule, this displacement being formed in the radial plane of the ferrule in which the tool-bit 5 is mounted.

Thus, at the end of the machining operation, the retraction of the tool-bit is obtained by the action of the push-rod 11 applied against the extremity 6a of the rod 6, compressing the restoring means 9 and causing the rod 6 and the ferrule 2 to move forward within the limit of the axial play 14, from which it results that when the conical surfaces 3 and 4 are separated, the bending stress of the rod 6 has the effect of bringing the point of the tool-bit 5 closer to the axis of the body 1. The retraction thus produced is in this case dependent on the play 14 and on the apex angle of the conical surfaces 3, 4.

The re-setting of the tool-bit in the machining position is obtained by annulling the action of the push-rod 11, the restoring means 9 ensuring the return to the position shown on the drawing.

The rod 6 is preferably flattened over the greater part of its length and is orientated during assembly as shown, in order to increase its flexibility in the radial plane of movement of the tool-bit.

Taking into account the relative axial mobility of the ferrule 2 and the body 1, there is provided between them a fluid-tight sliding joint intended to protect the conical surfaces 3 and 4 against swarf and cutting liquid, this fluid-tightness being ensured by means of two toric joints 18 mounted in grooves in the ferrule and the body, and co-operating with a sleeve 19 interposed between these latter. Another protective toric joint 20 is provided on the piston 8 in the body 1.

Figure 2:
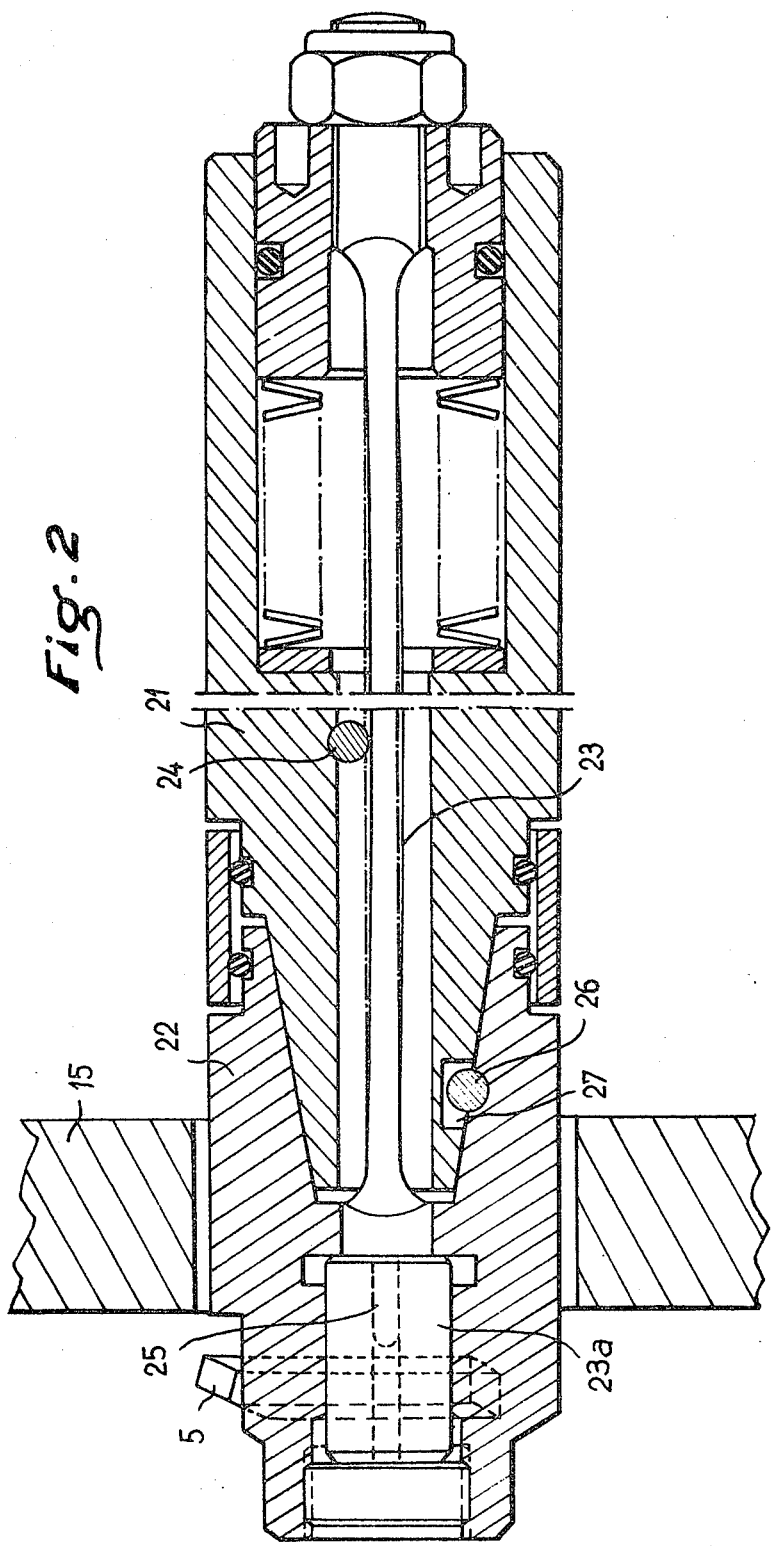
FIG. 2 is a similar view of another tool-carrier.

FIG. 2 illustrates another form of construction of a tool-carrier according to the invention which is essentially distinguished from the preceding embodiment by the manner in which the rod is stressed in bending, and by the secondary fact that the arrangement of the male and female cones is reversed on the body 21 of the tool-carrier and the tool-bit holder ferrule 22.

In this case, the rod 23 is mounted in the common axis of the ferrule 22 and the tool-carrier 21, and the bending stress is given to it by means of a pin 24 (which may carry a roller ring in contact with the rod) but it could also be given by prior continuous deformation on assembly, such as bending while cold or while hot.

It can furthermore be seen that the rod 23 is in this case blocked axially in the ferrule 22 by its shouldered head 23a and is immobilized for rotation by a key 25, while the pin 26 which fixes the body 21 to the ferrule 22 for rotation forms between them a certain axial play 27.

As previously, a thrust applied at the rear of the rod 23 will have the effect, by causing the ferrule 22 to move forward by the axial play 27 with respect to the body 21, and due to the bending stress of the rod 23, to bring the point of the tool-bit closer to the axis of the body 21, that is to say to effect the retraction of the tool-bit. In the absence of a thrust, the return means acting on the rod 23 maintains the device in the position of machining shown in the drawing.

The restoring means could be constituted not only by springs but could also be of the type with fluid under pressure acting on the above-mentioned piston.

The tool-carrier according to the invention may not only constitute a tool-carrier proper intended to be added on the nose of a spindle, as illustrated in the example of FIG. 1, but it may also constitute the spindle itself, as illustrated in FIG. 2, and may then further receive bearings for guiding it in a spindle-carrier and the devices necessary for driving it in rotation.

Other forms of construction may be envisaged, while remaining within the scope of the invention.

This invention may especially be utilized on any boring machine in which it is desired to use a controlled retraction of the tool-bit. Its small size makes it suitable for bores of the order of 30 to 35 mm. in diameter and less. Due to the fact that it is presented like a normal tool-carrier, it may even be employed in cases where the finished boring operation does not absolutely necessitate retraction of the tool-bit, but in which the subsequent possibility of testing exists or even the general use of the feature of retraction of the tool-bit is required.

What I claim is:

1. A tool carrier with a retractable tool bit, comprising; a tool carrier body, a bit holder member displaceably mounted with respect to said tool carrier body in order to cause the tool bit to pass from a working position to a retracted position and vice-versa, in which the bit holder member and the tool carrier body have conical surfaces for centering said carrier body and said bit holder member in a position in an axis on which said carrier body and said bit holder member are displaceable, a rod rigidly fixed to said bit holder member and in which the extremities of the rod are arranged substantially along said axis, and restoring means in said body tending normally to return said conical surfaces to the centering position, said rod being subjected to said restoring means, said rod being further subjected in the centering position to a bending stress which tends to cause said bit holder member to move radially closer to said axis when said carrier body and said holder member are displaced from their centering position by the action of an external force.

2. A tool carrier with a retractable bit as claimed in claim 1, in which said tool carrier body is an integral part of a machining spindle.

3. A tool carrier with a retractable bit, as claimed in claim 1, in which the conical assembly formed respectively by the conical surfaces of said bit holder member and the tool carrier body is non-jamming.

4. A tool carrier with a retractable bit, as claimed in claim 1, in which said rod comprises over a large part of its length, at least one flat portion, increasing its flexibility in a radial plane of said tool carrier passing through the point of said tool bit.

5. A tool carrier with a retractable bit, as claimed in claim 1, in which the bending stress of said rod is obtained by making its centering eccentric in one of the two parts which constitute said bit holder member and said tool carrier body, this eccentricity being effected in the radial plane of said tool carrier passing through the point of said tool bit.

6. A tool carrier with a retractable bit, as claimed in claim 1, in which the stress in said rod is obtained by a prior deformation of said rod in the plane of retraction of said tool bit.

7. A tool carrier with a retractable bit as claimed in claim 1, in which the stress in said rod is obtained by a member rigidly fixed to said tool carrier body and stressing said rod in bending in the radial plane of retraction of said tool bit.

8. A tool carrier with a retractable bit as claimed in claim 1, in which there is provided between said bit holder member and said tool carrier body a sleeve adapted to surround said member and said body and co-operating with fluid-tight sealing joints with which said member and said body are respectively provided.

* * * * *